(12) United States Patent
Griffin et al.

(10) Patent No.: US 8,318,005 B2
(45) Date of Patent: Nov. 27, 2012

(54) TETRA-SULFO IRON-PHTHALOCYANINE AND RELATED METHODS

(75) Inventors: John M. Griffin, Pearland, TX (US); Stephen A. Bedell, Lake Jackson, TX (US); Clare M. Worley, Richwood, TX (US)

(73) Assignee: DOW Global Technologies LLC, Midland, MI (US)

( * ) Notice: Subject to any disclaimer, the term of this patent is extended or adjusted under 35 U.S.C. 154(b) by 686 days.

(21) Appl. No.: 12/448,439

(22) PCT Filed: Dec. 21, 2007

(86) PCT No.: PCT/US2007/026208
§ 371 (c)(1),
(2), (4) Date: Sep. 21, 2009

(87) PCT Pub. No.: WO2008/079356
PCT Pub. Date: Jul. 3, 2008

(65) Prior Publication Data
US 2010/0012553 A1  Jan. 21, 2010

Related U.S. Application Data

(60) Provisional application No. 60/876,931, filed on Dec. 22, 2006.

(51) Int. Cl.
*C10G 29/04* (2006.01)
(52) U.S. Cl. ........ 208/207; 208/206; 502/163; 540/122; 540/139; 540/140; 540/144
(58) Field of Classification Search .................. 502/163; 524/131; 540/122, 139–140, 144; 208/206–207
See application file for complete search history.

(56) References Cited

U.S. PATENT DOCUMENTS

| | | | |
|---|---|---|---|
| 2,613,128 A | 10/1952 | Baumann et al. | |
| 2,853,432 A | 9/1958 | Gleim et al. | |
| 2,882,224 A | 4/1959 | Gleim et al. | |
| 2,988,500 A | 6/1961 | Gleim et al. | |
| 3,074,958 A | 1/1963 | Fleysher et al. | |
| 3,252,992 A | 5/1966 | Drenchko | |
| 3,393,200 A | 7/1968 | Bachmann et al. | |
| 3,801,591 A | 4/1974 | Jackson | |
| 3,853,432 A | 12/1974 | Cronstedt | |
| 3,857,855 A | 12/1974 | Idelson | |
| 4,048,097 A | 9/1977 | Douglas | |
| 4,078,992 A | 3/1978 | Douglas | |
| 4,206,043 A * | 6/1980 | Carlson | 208/207 |
| 4,753,722 A | 6/1988 | Le et al. | |
| 4,956,325 A * | 9/1990 | Ngoc Le | 502/163 |
| 5,126,297 A | 6/1992 | Hardison et al. | |
| 5,759,725 A | 6/1998 | Hirao et al. | |
| 5,759,726 A | 6/1998 | Tambo et al. | |
| 6,490,548 B1 | 12/2002 | Engel | |
| 6,531,103 B1 | 3/2003 | Hakka et al. | |
| 6,740,619 B1 | 5/2004 | Sain et al. | |
| 7,014,751 B2 | 3/2006 | Greaney et al. | |

FOREIGN PATENT DOCUMENTS

| | | |
|---|---|---|
| CN | 1384174 | 12/2002 |
| DE | 2706516 | 8/1977 |
| DE | 3930145 | 3/1991 |
| EP | 1 268 710 B1 | 9/2001 |
| GB | 503029 | 3/1939 |
| JP | 6220061 | 8/1994 |
| JP | 1994220061 A | 8/1994 |

OTHER PUBLICATIONS

Komarov, R.D. et al., "Synthesis of iron phthalocyanine from phthalic anhydride," Chemical Abstracts, vol. 100, No. 20, (XP-002483031) 1984.
Fukada, N., "Phthalocyanine derivatives. V. Salts or iron phthalocyanine-r-sulfonic acid," Chemical Abstracts, vol. 54, No. 2, (XP002483032) 1957.
Weber, J.H. et al., "Complexes derived from Strong Field Ligands," Inorg. Chem., vol. 4, No. 4, pp. 469-471, 472-475, 1965.
McKeown, N.B., "Product Class 9: Phthalocyanines and Related Compounds," Science of Synthesis, vol. 17, No. 1, pp. 1237-1326, Jan. 2004.
Sekiguchi et al., "Organic pigments of the phthalocyanine series," vol. 72(5), pp. 1156-1160 (1969) (abstract).
P. Day, et al., "Some Reactions of Cobalt Phthalocyanines," J. Chem. Soc. (A), pp. 90-93 (1968).
Borisenkova et al., Carbonic Acid Decarboxylation in the Presence of Transition Metal Phthalocyanines, Journal of Organic Chemistry, vol. IX, No. 9, 1822-1830 (1973), including Translation.
Konovalov, et al., Study of Maleinic Acid into Fumaric Acid Isomerization Under Thiourea Impact Kinetics, Journal of Organic Chemistry, vol. IX. No. 9, 1830 (1973).
Fukada, Nippon Kagoku Zasshi 79, 396-399 (1958), including translation.
Kundo et al., "Catalytic Properties of Phthalocyanines in Cysteine Oxidation," Kinet Katal 8, 1119-1124 (1967).
Przywarska-Boniecka, "Rhenium(IV) Phthalocyanine Complexes. Part II. Hydroxochiororhenium Tetrasulfonated Phthalocyanine," Roczniki Chemii 41, 1703-10 (1967).

* cited by examiner

*Primary Examiner* — Brian McCaig
(74) *Attorney, Agent, or Firm* — Kagan Binder PLLC

(57) ABSTRACT

The present invention relates to making tetra-sulfo iron-phthalocyanine by reacting sulfonated reactant(s) in the presence a boron-containing promoter. The present invention also relates to making tetra-sulfo iron phthalocyanine more tolerant to oxygen by combining the tetra-sulfo iron-phthalocyanine with a stabilizing amount of a complexing agent (e.g., a stabilizing amine) and/or contacting the tetra-sulfo iron-phthalocyanine with steam.

18 Claims, No Drawings

TETRA-SULFO IRON-PHTHALOCYANINE AND RELATED METHODS

PRIORITY CLAIM

The present non-provisional patent Application claims benefit from International Application No. PCT/US2007/026208, filed Dec. 21, 2007, having International Publication No. WO 2008/079356 A2, which in turn claims priority to U.S. Provisional Patent Application having Ser. No. 60/876,931, filed on Dec. 22, 2006, by Griffin et al., and titled TREATMENT OF HYDROCARBON STREAMS USING TETRA-SULFO IRON-PHTHALOCYANINE, wherein the entirety of said patent applications are incorporated herein by reference.

FIELD OF THE INVENTION

The present invention relates to stabilized solutions of tetra-sulfo iron-phthalocyanine, and improved methods of making and using hydrocarbon treatment compositions including tetra-sulfo iron-phthalocyanine.

BACKGROUND OF THE INVENTION

The fixed bed sweetening of hydrocarbons is well known in the art. For example, a typical process is disclosed in U.S. Pat. No. 2,988,500, wherein a sour petroleum distillate is contacted with a fixed bed of a metal phthalocyanine catalyst combined with a charcoal carrier in the presence of oxygen and an alkaline reagent. In fixed bed treating processes in general, the refiner has a high degree of control over the sweetening operation, and can be reasonably sure that all of the hydrocarbon passing through the fixed bed will be treated.

Liquid-liquid sweetening is also well known in the refining arts. In this process a metal chelate is dispersed or dissolved in an alkaline medium. The alkaline medium can be used to extract mercaptans from a hydrocarbon stream, with regeneration of the alkaline medium via oxidation of mercaptans to disulfides occurring in a separate vessel. Alternatively, the hydrocarbon, the alkaline medium with catalyst, and an oxidizing agent may be contacted in a single vessel. An example of this is provided by U.S. Pat. No. 3,853,432, which discloses many details of catalysts and alkaline mediums which may be used. That patent also teaches that it is desirable to use a sulfonated derivative of a metal phthalocyanine to increase the solubility of the phthalocyanine catalyst in the alkaline medium.

A feature common to these and other sweetening operations is use of a metal phthalocyanine catalyst. Many methods of metal phthalocyanine preparation are known in the art. One such method involves contacting metal hydroxide with quinoline in an inert organic solvent and subsequently adding a solution containing a phthalonitrile to obtain the desired phthalocyanine compound. The metal phthalocyanines may be halogenated by various procedures, such as are shown in U.S. Pat. Nos. 3,393,200 and 3,252,992. Further, U.S. Pat. No. 3,074,958 discloses a method for the preparation of a metal phthalocyanine compound by heating a mixture containing a phthalic acid, urea or another nitrogen donor, a metal donor and ammonium chloride, which improves the yield of the metal phthalocyanine compound.

However, some of the phthalocyanines produced by known processes suffer from insufficient solubility in the stream requiring sweetening, particularly in streams requiring reduction in mercaptan levels. This problem is encountered particularly in liquid-liquid processes, and has prompted work to be done towards preparing sulfur-containing derivatives of metal phthalocyanines. The solubility problem has also been addressed in another art, that of dyes and pigments, where metal phthalocyanines also find use.

There are known only a few methods of forming sulfur-containing derivatives of metal phthalocyanines. Perhaps the oldest method is sulfonation in oleum. One example of this sulfonation method is given in U.K. 503,029, which teaches a way to prepare copper phthalocyanines, followed by reaction of the phthalocyanines with sulfuric acid to produce a product termed a sulphate. Preparation of tetra-sulfo copper-phthalocyanines is disclosed in Sekiguchi, et al., *Chem. Abstracts*, Volume 71, Item 1031530 (1969), wherein a tetrasulfonate is made by first preparing the phthalocyanine and then sulfonating in oleum or sulfuric acid.

Day, in J. Chem. Soc. (A), 90 (1963), disclosed preparing a cobalt phthalocyanine tetrasulfonate from cobalt phthalocyanine by sulfonation in sulfuric acid and oleum. Borisenkova, et al., *ZH. Organischeskoi Khim.*, 9, 1822-1830 (1973), also disclosed preparation of phthalocyanines by the reaction of metal powder with phthalonitrile. The phthalocyanines were prepared using nitrobenzene as a solvent. This material was sulfonated using oleum.

A second category or type of preparation of sulfur-containing derivatives of phthalocyanine involves preparing a phthalocyanine from reactants already containing a sulfur moiety. In these methods any phthalocyanine prepared is automatically a sulfur-containing phthalocyanine. One of these is disclosed by Fukada, in *Nippon Kagoku Zasshi* 79, 396-0 (1958), which shows various methods of preparation of phthalocyanine tetrasulfonates. Fukada prepares his tetrasulfonate using triammonium 4-sulfophthalate, by carrying out a reaction at 240° C. Various modification of Fukada's method have been proposed, including Webber and Busch's modification disclosed in *Inorg. Chem.* 4, 469-71 (1965), ibid., 472-5, wherein nitrobenzene is used as a solvent. Another variation is disclosed by Kundo et al., *Kinet Katal* 8, 1325-30 (1967), which teaches a melt, or dry, reaction which occurs at 200 to 210° C. for six hours. Kundo et al. disclose that their catalyst can convert cysteine to cystine. This is an example of conversion of a mercaptan to a disulfide, though Kundo uses a biological system involving an amino acid.

Another closely related method of preparing sulfur-containing phthalocyanines is disclosed by Przywarska-Boniecka, *Rocz. Chem.* 41, 1703-10 (1967), which includes a method similar to Fukada's, but mentions that the maximum reaction temperature should be 240° C. The metal used in that study is rhenium. Oxidation of mercaptans was not studied.

In general, there exists one or more drawbacks of known treatment compositions that include sulfonated iron-phthalocyanine. One drawback is that the sulfonated iron-phthalocyanine reaction products tend to have an undesirable impurity load. Such impurity loads can cause manufacturing and/or use issues. For example, in the context of including sulfonated iron-phthalocyanine in a treatment composition to treat a hydrocarbon, such treatment compositions may exhibit one or more of the following undesirable characteristics during one or more hydrocarbon treatment processes: poor filtering, excessive foaming of the treatment composition, contamination of the treatment composition, and iron solids. Another drawback is that many methods of making sulfonated iron-phthalocyanine are known to result in residual promoter being present in the reaction product. Although tolerable when these materials are used as dyes, residual promoter can undesirably hinder the complexing activity of a sulfonated iron-phthalocyanine in the context of hydrocarbon treatment. Yet another drawback can be poor stability/vulnerability of a sulfonated iron-phthalocyanine to oxygen in the ambient or oxygen that may be dissolved in admixture containing the phthalocyanine material. Exposing sulfonated iron-phthalocyanine to oxygen can undesirably cause Fe(II) to convert to Fe(III) which is vulnerable to iron-sulfide/iron-hydroxide solids formation. This vulnerability to oxygen makes the sulfonated iron-phthalocyanine difficult to use in practice.

SUMMARY OF THE INVENTION

The present invention provides compositions that stabilize metal phthalocyanine complexes with respect to oxygen vulnerability as well as improved treatment compositions based on tetra-sulfo iron-phthalocyanine. The present invention also provides methods of making and using such stabilizing and treatment compositions.

It has been discovered that tetra-sulfo iron-phthalocyanine can be made with a substantially reduced impurity load and reduced residual promoter, and in this form is very well-suited for use in hydrocarbon treatment. Increased levels of tetra-sulfo iron-phthalocyanine purity can be achieved by using pre-sulfonated reactant(s) to make the phthalocyanine ring in the presence of a boron-containing promoter. Using pre-sulfonated reactant(s) avoids the substantial level of impurities (e.g., sulfonated impurities such as sulfonated phthalimide, sulfonated phthalic acid, combinations of these, and the like) that can result when post-sulfonating the phthalocyanine ring after ring formation. Sulfonated impurities can be formed in situ (e.g., sulfophthalimide) or can be left-over starting material (e.g., sulfophthalic acid). Sulfonated impurities such as sulfonated phthalimide and/or sulfonated phthalic acid can form heat stable salts in an amine composition (e.g., an amine concentrate or an amine treatment composition). Forming such salts can undesirably lower the composition pH, which can impair performance. In the context of a hydrocarbon treatment composition, the higher level of tetra-sulfo iron-phthalocyanine purity reduces foaming of the treatment composition, improves filterability of the treatment composition, and avoids contamination of the treatment composition with these impurities. The boron-containing promoter is effective at producing higher yields of tetra-sulfo iron-phthalocyanine as little if any boron, chelated or otherwise, remains. Virtually all of the boron can be easily washed out to a degree such that boron level in the resultant tetra-sulfo iron-phthalocyanine reaction product is below detection limits. Accordingly, using a boron-containing promoter provides more desired product and a reduced risk of having an undue amount of unchelated iron and a reduced risk of the residual boron hindering complexing activity of the tetra-sulfo iron-phthalocyanine. Unchelated iron can form iron sulfide, for example, upon exposure to hydrogen sulfide. Iron sulfide can undesirably precipitate such that processing equipment can become clogged/fouled and the like.

It has also been discovered that tetra-sulfo iron-phthalocyanine can be made to be more stable/tolerant with respect to oxygen by combining the tetra-sulfo iron-phthalocyanine complex with a stabilizing amount of an additional complexing agent of moderate complexing strength such as an amine, particularly in aqueous admixture. Although not wishing to be bound by theory, it is believed that because the phthalocyanine ring coordinates to only four of the six available coordination sites of iron, the additional complexing agent coordinates to one or both of the remaining two coordination sites of iron. It is believed that this additional coordination is what helps protect the iron against oxygen. Consequently, the additional complexing agent desirably includes at least two functional groups, e.g., amino moieties, capable of complexing with Fe. In preferred embodiments, the stabilizing amount of the additional complexing agent is at least the stoichiometric amount needed to complex the Fe present. Less can be used, but this could leave some complexing sites open on the Fe, possibly exposing that Fe to an increased risk of oxygen degradation. Without wishing to be bound by theory, it is believed that a "composite" complex forms in which the iron is complexed to both the phalocyanine ring and to the additional complexing agent.

Most desirably, this strategy is used when the iron in the complex comprises Fe(II), and more preferably is substantially all Fe(II). Iron(III) is undesirably more prone to precipitation as iron sulfide and/or iron hydroxide than Fe(II). In the absence of the additional complexing agent, iron precipitates more readily occur such as via formation of iron sulfide in the presence of hydrogen sulfide. It is believed that this occurs because oxygen converts the Fe(II) to Fe(III). In contrast, when the additional complexing agent is used, particularly in at least stoichiometric amounts needed to coordinate to remaining coordination sites not taken up by the phthalocyanine ring, very little if any of this precipitation is observed. It appears, therefore, that the additional complexing agent such as an amine protects the Fe(II) against undue conversion to iron(III). Advantageously, therefore, the tetra-sulfo iron-phthalocyanine stabilized with an additional complexing agent can be exposed to oxygen (e.g., the ambient or dissolved oxygen) without the tetra-sulfo iron-phthalocyanine being degraded to an undue degree. The stabilized tetra-sulfo iron-phthalocyanine is easier to handle, store, and transport. The material enjoys long shelf-life in ordinary aqueous solution when protected by an amine. In the context of removing mercaptans from a hydrocarbon, the coordination between the additional complexing agent, such as an amine, is of moderate strength so that the additional complexing agent is readily replaced by the mercaptans in a hydrocarbon stream being treated. In this way, the iron phthalocyanine complex coordinates with the mercaptan impurities, allowing those impurities to be more easily removed from the hydrocarbon. Other complexing agents that can coordinate with iron in a similar manner as a stabilizing amine can also be used. The effectiveness and/or stability of the iron phthalocyanine/additional complexing agent composite can be further enhanced in some embodiments by further contacting the composite with steam. It is believed that the steam treatment strips away oxygen that might become associated with the iron in the complex. Such oxygen associated with the iron can cause iron(II) to be converted to iron(III) and/or convert mercaptans to disulfides. Iron(III) is undesirably more prone to precipitation as iron sulfide and/or iron hydroxide than iron(II). Converting mercaptans to disulfides can undesirably make removal of these impurities more difficult.

The above advantages can be used singly or in combination when making and/or using tetra-sulfo iron-phthalocyanine. Making and/or handling tetra-sulfo iron-phthalocyanine as described above has been found to be particularly effective when using the tetra-sulfo iron-phthalocyanine to remove at least a portion of the mercaptans from a hydrocarbon stream.

According to one aspect of the present invention, a method of providing a hydrocarbon treatment composition includes (a) using a sulfonated reactant in the presence of a boron-containing promoter to make tetra-sulfo iron-phthalocyanine and (b) causing the tetra-sulfo iron-phthalocyanine to be combined at least with a treatment amine to form a hydrocarbon treatment composition.

According to another aspect of the present invention, a method of treating a hydrocarbon includes (a) providing an aqueous solution including tetra-sulfo iron-phthalocyanine and a stabilizing amount of a complexing agent, (b) combining the aqueous solution at least with an amount of a treatment amine to form a hydrocarbon treatment composition, and (c) contacting a hydrocarbon with the hydrocarbon treatment composition.

According to another aspect of the present invention, an aqueous solution includes (a) a stabilizing amount of a complexing agent and (b) tetra-sulfo iron-phthalocyanine.

According to another aspect of the present invention, a method of making an aqueous solution includes combining tetra-sulfo iron-phthalocyanine at least with a stabilizing amount of a complexing agent to form the aqueous solution.

In preferred embodiments, the complexing agent includes a stabilizing amine.

According to another aspect of the present invention, a method of purifying a tetra-sulfo iron-phthalocyanine reaction product includes (a) using a sulfonated reactant in the presence of a boron-containing promoter to make tetra-sulfo iron-phthalocyanine, (b) washing the tetra-sulfo iron-phthalocyanine in an acidic medium, and (c) after step (b), contacting the tetra-sulfo iron-phthalocyanine with a medium comprising at least one alcohol.

DETAILED DESCRIPTION OF THE INVENTION

The description and examples discussed herein are intended to provide to the skilled practitioner the general concepts, means and methods necessary to understand the invention and, when combined with a level of understanding typical of those skilled in the art, to practice it. It will therefore be understood that not all embodiments deemed to be within the scope of the invention are herein explicitly described, and that many variations of each embodiment, including but not limited to selection of specific reactants, mixing order, reaction times, temperatures and other conditions, treatment protocols and equipment, and the like, not described explicitly or in detail herein, will still fall within the general scope of the invention.

Preparation of tetra-sulfo iron-phthalocyanine preferably begins with selection of a sulfonated starting material. In other words, the tetra-sulfo ring structure of the phthalocyanine is derived from reactants that are already sulfonated when incorporated into the ring. This is contrasted to approaches in which all sulfonate groups are added after phthalocyanine ring formation. Starting with sulfonated reactants to make tetra-sulfo iron-phthalocyanine advantageously results in lower levels of impurities in the final product. This helps make the resultant sulfonated phthalocyanine well suited to use as active co-ingredient in amine-based compositions used to treat hydrocarbon streams.

In preferred embodiments, the sulfonated reactant includes a sulfonated, aromatic reactant having at least first and second reactive carbonyl moieties suitable for phthalocyanine ring formation via reaction with an iron donor and a nitrogen donor in the presence of a boron-containing promoter. In certain embodiments, the sulfonated aromatic reactant is selected from the group consisting of a sulfonated phthalic acid or a salt thereof, a sulfonated derivative of phthalic acid or a salt thereof, and combinations thereof. Preferably, the sulfonated aromatic reactant is selected from the group consisting of 4-sulfophthalic acid or a salt thereof, 4-sulfophthalimide or a salt thereof, 4-sulfophthalic anhydride, and combinations thereof. In this invention a preferred sulfonated starting material includes 4-sulfophthalic acid or a salt thereof. Such may include, but is not limited to, triammonium 4-sulfophthalate. If the salt is selected, it may possess a wide variety of cations, such as, for example, lithium, potassium, rubidium, cesium, barium, strontium, calcium, magnesium, beryllium, titanium, scandium, zirconium, manganese, rhenium, combinations thereof, and the like.

It is important to note that, while it is desirable for the sake of efficiency that a major portion of the sulfonated reactant be sulfonated at the four position, it is not necessary that all of it be sulfonated at that position. For example, some commercial preparations of 4-sulfophthalic acid contain about 75 percent by weight of the 4-sulfophthalic acid, and about 25 percent by weight of the 3-sulfophthalic acid. Such preparations may be used as the sulfonated starting material in certain non-limiting embodiments of the invention.

In preferred embodiments, the sulfonated reactant is reacted with an iron donor and a nitrogen donor in the presence of a boron-containing promoter to make the tetra-sulfo iron-phthalocyanine.

The iron donor is preferably a metallic iron, an iron salt, and combinations thereof. Any iron salt may be used. For example, the salt may be a sulfate, nitrate, oxalate; acetate; chloride, or the like. It is also possible to start with metallic iron, such as iron dust, which may form an iron salt, in situ, during the course of the reaction. In preferred embodiments, the iron donor includes an iron(II) salt in that iron(III) tends to be more prone to precipitation issues. If iron(III) is used as all or a portion of the starting material, all or a portion of the iron(III) is preferably reduced to iron(II). In certain preferred embodiments, the iron(II) salt includes ammonium iron(II) sulfate hexahydrate.

The so-called "nitrogen donor" used in the invention may be any compound, or combination of compounds, that will decompose to give ammonia or that will react with phthalates to form amides, imides, or any typical precursor to the characteristic phthalocyanine ring. These compounds are well known in the art and include, for example, urea, aluminum ammonium sulfate, ammonium borate, biuret, hydrazine, guanidine, combinations thereof, and the like. Of these, urea is particularly preferred, for reasons of excellent availability, low cost, and its melt temperature, which enables it to simultaneously act as both a reactant and a reaction medium, i.e., it enables a "melt" or "dry" reaction, which in turn enables good contact between all of the reactants and thereby facilitates the reaction.

According to one aspect, a process of the present invention to form the tetra-sulfo iron-phthalocyanine from reactants including a sulfonated reactant, an iron donor, and a nitrogen donor is carried out in the presence of a boron-containing promoter. The boron-containing promoter operates to facilitate formation of tetra-sulfo iron-phthalocyanine, but advantageously the boron-containing promoter is not incorporated into the phthalocyanine ring structure to a significant or undesirable extent. In some embodiments, no boron could be detected in the final product within the detection limits of the equipment used for analysis. Because the boron-containing promoter does not substantially incorporate into the ring structure when such structure is based substantially around an iron atom, a greater amount of the iron is incorporated into the phthalocyanine ring of the final product. Without wishing to be bound by any theory, it is believed that iron efficiently replaces boron in the phthalocyanine ring. Subsequently, the boron can be substantially washed out during one or more washing steps.

In contrast to boron-containing promoters, it is theorized that some other known promoters used in phthalocyanine preparation, such as molybdenum in various forms, remain more stably in the phthalocyanine ring when confronted with an iron atom. Such stability may not only undesirably lower the level of incorporation of the desired iron atom, but may also effectively act as a poison to the effectiveness of a resultant treatment composition. Boron is significantly better in this context since iron is a much better competitor for sites in the phthalocyanine ring, and the uncomplexed boron is easily washed out. Thus, it is anticipated that any molecule that participates in the ring-forming reaction, but is then replaced, relatively easily, in the ring by an iron atom, could be an effective promoter.

Boron compounds such as boric acid have been found in the present invention to be highly effective promoters.

Notwithstanding the above, in certain non-limiting embodiments, it may be useful to employ more than one promoter at a time. For example, the boron-containing promoter may be used in conjunction with a molybdenum-containing promoter. Molybdenum-containing promoters have been widely used for preparation of phthalocyanines, but their use tends to result in relatively high residual amounts (greater than about 1 percent by weight) of molybdenum, and relatively poor performance when such phthalocyanines are used to remove mercaptans. Use of the boron-containing promoter enables the skilled practitioner to either eliminate molybdenum-based promoters completely, or to substantially reduce their use, with the result that less residual molybdenum is encountered in the final tetra-sulfo iron-phthalocyanine. Examples of molybdenum-based promoters include molybdic oxide, phosphomolybdic acid, ammonium molybdate tetrahydrate, combinations thereof, and the like.

It should be noted that the reaction of the present invention is desirably, in certain embodiments, carried out in the substantial absence of non-sulfonated, aromatic compounds having at least first and second reactive carbonyl moieties. This is to help ensure that as much of the resultant phthalocyanine is tetra-functional as possible to thereby enhance solubility in the amine-based treatment composition. An example of non-sulfonated, aromatic compounds having at least first and second reactive carbonyl moieties includes a non-sulfonated 1,2-dicarboxylic acid or a salt thereof, or a non-sulfonated derivative of 1,2-dicarboxylic acid or a salt thereof. Typical of such acids are non-sulfonated benzene-1,2-dicarboxylic acid and non-sulfonated derivatives thereof, including, in non-limiting embodiments, non-sulfonated benzene-1,2-dicarboxylic acid anhydride (also known as phthalic anhydride) and non-sulfonated benzene-1,2-dicarboxylic acid diamide (phthalic diamide); other non-sulfonated derivatives including those commonly known as non-sulfonated phthalamic acid, non-sulfonated dicyanobenzene, non-sulfonated phthalimide, and non-sulfonated phthalonitrile; combinations thereof; and the like.

As already noted hereinabove, it is desirable to combine the reactants together via admixture to facilitate their contact and effective reaction. The reaction medium may be one or more of the reactants themselves (such as the urea, which serves as such once it has melted), or a solvent such as nitrobenzene. It is possible to determine the reactant amounts by calculating the stoichiometry necessary to produce the tetra-sulfo iron-phthalocyanine. Where nitrobenzene is employed, the preferred amount is at least about 10 percent by weight, based on any dry reactants. In more preferred embodiments, the amount of nitrobenzene may vary from about 15 percent by weight to about 25 percent by weight.

The reaction pressure is not generally critical. This ring-forming reaction may generally be carried out at any pressure from sub-atmospheric to super-atmospheric, although it is generally most economical to carry it out at approximately atmospheric pressure.

The temperature profile used to carry out the process is desirably one that, first, drives off any water that may be present, and second, promotes the formation of the characteristic phthalocyanine ring structure around the iron atoms. For example, a first temperature of at least about 180° C., preferably from about 180° C. to about 200° C., for at least about 2 hours may be particularly effective at removing any water that may be present. Thereafter, a ramp-up to above about 200° C., preferably from about 200° C. to about 230° C., more preferably about 215° C. to about 225° C., for at least about 5 hours, followed by in some embodiments a further ramp-up to about 235° C. to about 245° C., has been found particularly efficacious, in some embodiments, in completing the phthalocyanine ring-forming reaction, without undesirable degradation of either the reactants or of the product. Selection of various specific reactants and adjustments of the balance between time, temperature, and pressure may enable effective use of a number of alternative profiles while still achieving the same, or substantially the same, tetra-sulfo iron-phthalocyanine reaction product.

The heating and reaction may be carried out in appropriate vessels and equipment known to those skilled in the art, at a desirable scale. For example, in one non-limiting embodiment, a common muffle furnace may enable effective heating and reaction.

Following heating and completion of the ring-forming reaction, the reaction product, which is now a solid phase, may be ground for convenience to form a powder. Optionally, the tetra-sulfo iron-phthalocyanine reaction product can be purified in any suitable fashion. According to one preferred purification technique, the product is first to an acid wash in the presence of a salt and then subjected to a solid phase extraction with an alcohol.

It has been discovered that washing the reaction product with an acid followed by contacting the tetra-sulfo iron-phthalocyanine with an alcohol, is a significantly efficient and effective procedure for purifying the reaction product.

Washing the reaction product in an acid is believed to aid in dissolving and removing one or more non-chelated metal ions such as boron, molybdenum, and even any leftover iron to levels below detection limits. Advantageously, reducing boron to such low levels means that boron does not remain to act as a complexing poison in a subsequent treatment composition. One preferred acid washing recipe includes using a combination of aqueous HCl and NaCl. It is desirable to include a salt of some type, such as the NaCl, in order to ensure that the tetra-sulfo iron-phthalocyanine remains in solid form throughout the wash. Alternative wash components may be used, provided they accomplish the same goals. During the washing process a slurry is formed, which may be brought to reflux, cooled, filtered, and dried. The wash product may then be ground to a powder for ease in continued processing.

Finally, the wash product may be extracted via one or more solid phase extractions. For this purpose any material that solubilizes the chlorides, or equivalents, that may be incorporated during the washing process, may be used, provided such does not also solubilize the tetra-sulfo iron-phthalocyanines. Furthermore, such extraction desirably removes organic materials (e.g., most or all of the intermediary phthalates and/or phthalimides that are generally formed during the primary phthalocyanine-forming reaction) that may cause foaming during hydrocarbon treatment. For this solid phase extraction any alcohol may be used, including, in certain non-limiting embodiments, methanol, ethanol, isopropanol, and mixtures thereof. For example, in one non-limiting embodiment a mixture of 80 percent by volume methanol with 20 percent by volume water has been found to be particularly effective.

The extraction may be done by, for example, adding the dried wash product powder to the methanol (or other alcohol or alcohol/water solution) to form a slurry, then bringing the slurry to reflux while stirring. The slurry may then be filtered while still hot and then washed with a small amount of boiling methanol. The resulting solid may then be dried to yield a final product. Such product desirably represents at least about 70 percent of theoretical yield, and in certain embodiments at least about 80 percent of theoretical yield.

The final product desirably exhibits the novel characteristics of the present invention. For example, in certain non-limiting embodiments there is present less than about 1 percent by weight of phthalimides, phthalates, or combinations thereof, based on the weight of the final product as a whole. In other non-limiting embodiments there is present less than about 1,000 parts per million (ppm) of these materials. In still other non-limiting-embodiments, there is present from about 1 to about 300 ppm of these materials.

The final product also desirably exhibits a level of chelated iron that is, in certain non-limiting embodiments, at least about 4.0 percent by weight, based on the weight of the final product as a whole. In other non-limiting embodiments the level of chelated iron is at least about 4.5 percent by weight, and in still other non-limiting embodiments the level of chelated iron is at least about 5.0 percent by weight. In yet other non-limiting embodiments the level of chelated iron is at least about 5.5 percent by weight.

It is also notable that, even when a molybdenum-containing promoter is included among the reactants, the molybdenum level may, in some embodiments, be much lower than that found in other processes promoted with molybdenum-based promoters simply because less of the molybdenum-containing promoter is needed. In certain desirable and non-limiting embodiments the molybdenum is present in the final product in an amount less than about 1,000 ppm, and in other non-limiting embodiments it is present in an amount less than about 100 ppm.

Preferably, the tetra-sulfo iron-phthalocyanine is made and then purified under anaerobic conditions that protect the tetra-sulfo iron-phthalocyanine from exposure to and corresponding degradation due to oxygen or other oxidizing agents. The tetra-sulfo iron-phthalocyanine can be protected from oxygen during manufacturing (e.g., during chemical reaction and the like) and purification by well-known practices such as degassing reagents, performing reactions in an inert atmosphere, combinations of these, and the like.

Significantly, it has now been discovered that metal complexes of phthalocyanine such as tetra-sulfo iron phthalocyanine can be stabilized and thereby become tolerant to exposure to oxygen exposure when the phthalocyanine complex is in admixture with a stabilizing complexing agent (e.g., an alkaline fluid such as an aqueous, amine solution). A phthalocyanine complex may be stabilized at any convenient time after manufacture. It is often convenient to stabilize the phthalocyanine complex after purification. The resultant admixtures of stabilized phthalocyanine complexes have extremely long shelf-life and can be handled without having to take special precautions to protect the phthalocyanine complex from oxygen exposure. The stabilized phthalocyanine complexes can tolerate oxygen exposure without being degraded to any undue degree.

In many embodiments, the stabilized phthalocyanine complex is provided in the form of an aqueous solution comprising the phthalocyanine complex and one or more additional complexing agents that function as stabilizers for the complex. In preferred embodiments, the stabilizing complexing agent includes one or more water soluble amines. Any type of water soluble amine may be used as a stabilizing amine including by way of example N-methyldiethanolamine (MDEA), diethanolamine (DEA), diethylene glycolamine (DGA), triethanolamine (TEA), piperazine, N-methylpiperazine, N-methylethanolamine (NMEA), monoethanol-amine (MEA), diisopropanolamine (DIPA), ammonia, mixtures thereof, and the like. In the context of an amine-based treatment composition that will be used to treat hydrocarbon streams, the amine stabilizer may be the same or different as the treatment amine.

The amounts of the phthalocyanine complex and one or more amine stabilizers incorporated into the aqueous solution can vary over a wide range. In preferred embodiments, the phthalocyanine complex is present in an amount in the range of from 95 to 5 weight percent based on the total weight of the solution. More preferably, the phthalocyanine complex is present in an amount in the range of from 90 to 10 weight percent, more preferably 85 to 15, more preferably 80 to 20, more preferably 75 to 25, more preferably 70 to 30, more preferably 65 to 35, and even more preferably 65 to 35 weight percent based on the total weight of the solution. In such preferred embodiments, the amine stabilizer is present in an amount in the range of from 5 to 95 weight percent based on the total weight of the solution. More preferably, the amine is present in an amount in the range of from 10 to 90 weight percent, more preferably 15 to 85, more preferably 20 to 80, more preferably 25 to 75, more preferably 30 to 70, more preferably 35 to 65, and even more preferably 35 to 65 weight percent based on the total weight of the solution.

In actual practice, the aqueous solution of the amine-stabilized complex is often prepared, stored, and/or shipped initially as a concentrate in which the concentration of the complex is greater than what will be present during hydrocarbon treatment. At a suitable time prior to treatment, often at the point of use, the concentrate is diluted with more water, combined with an alkaline reagent such as treatment amine(s), subjected to one or more optional treatments (e.g., an optional steam treatment that may occur prior to, during or after combining with the treatment amine is described further below that enhances the complexing activity of the complex), and/or combined with one or more additional ingredients to form the desired treatment composition.

The final product, a superior tetra-sulfo iron-phthalocyanine product, may be useful for any application for which other tetra-sulfo metal phthalocyanines are known to be useful. Surprisingly, it has now been found that the tetra-sulfo iron-phthalocyanine product prepared by the inventive method and/or the amine-stabilized tetra-sulfo iron-phthalocyanine, having the particular characteristics described hereinabove, are unusually capable treatment agents for removing mercaptans from hydrocarbon streams, particularly natural gas streams. In this application the tetra-sulfo iron-phthalocyanine does not chemically oxidize the mercaptans to form disulfides, but rather simply removes at least a portion of them as mercaptan compounds. The tetra-sulfo iron-phthalocyanine coordinates with mercaptan ("captures" the mercaptan) and can then "release" the mercaptan when desired.

Mercaptans vary in type depending upon the charge stock, but in natural gas, methyl mercaptan or ethyl mercaptan are most commonly present. In heavier crude oil or kerosene charge stocks, branched chain aliphatic mercaptans, such as tertiary dodecyl mercaptan, or aromatic mercaptans, such as thiophenol and substituted thiophenols, may be present. In general, those in petroleum hydrocarbons may possess anywhere from 1 to 19 carbon atoms.

The overall activity of the tetra-sulfo iron-phthalocyanine final product and/or the amine-stabilized tetra-sulfo iron-phthalocyanine of the invention in accomplishing such removal is, in many embodiments, higher than that of sulfo iron-phthalocyanines that may be prepared by alternative processes. The inventive product's performance relating to foaming in the hydrocarbon stream and filterability in both liquid-liquid and gas-liquid treatment exhibits desirable improvements, also in comparison with other known sulfo iron-phthalocyanines.

Systems for which the tetra-sulfo iron-phthalocyanine may be used include batch or continuous treatments. For example, U.S. Pat. No. 2,988,500, which is incorporated herein by reference in its entirety, discloses one type of treatment process. Descriptions of a liquid phase operation are disclosed in, for example, U.S. Pat. Nos. 2,853,432 and 2,882,224, which are incorporated herein by reference in their entireties.

In one efficacious but non-limiting embodiment, the tetra-sulfo iron-phthalocyanine may be used to lower the level of mercaptans in gas-liquid or liquid-liquid sweetening systems including treatment compositions that include one or more treatment amines. Treatment amines typically used with these systems may include, in non-limiting embodiments, N-methyldiethanolamine (MDEA), diethanolamine (DEA), diethylene glycolamine (DGA), triethanolamine (TEA), piperazine, N-methylpiperazine, N-methylethanolamine (NMEA), monoethanol-amine (MEA), diisopropanolamine (DIPA), mixtures thereof, and the like. These treatment amines may be used with other well-known aqueous and organic solvents typically used in the art to treat contaminated hydrocarbon feed streams, whether such are liquid, gas, or a combination thereof, and particularly those containing mercaptans.

In such systems the tetra-sulfo iron-phthalocyanine may be incorporated at any point into the treatment amine or other treatment composition prior to introduction of such composition into the absorber or other contactor. It is well known in the art that such treatment compositions are frequently combined with water in, for example, an approximately 50/50 mixture, and that such are often then distilled to drive off at least a portion of the water. In these types of systems it has been found to be particularly effective to introduce the tetra-sulfo iron-phthalocyanine as a treatment agent into the treatment composition at a point where the composition is being subjected to this distillation process and, in particular, the steam resulting from the distillation, e.g., near the top of a distillation apparatus. At least a portion of tetra-sulfo iron-phthalocyanine can be caused to contact the steam at a time prior to, during, and/or after incorporating the tetra-sulfo iron-phthalocyanine into the treatment composition (e.g., treatment amine). In certain embodiments, when contacting the tetra-sulfo iron-phthalocyanine with steam, the tetra-sulfo iron-phthalocyanine can be present in solution with a stabilizing amount of a stabilizing amine (discussed above). Without wishing to be bound by any theory, it is believed that this subjection of the tetra-sulfo iron-phthalocyanine to steam effectively drives off at least a portion of the oxygen that may remain bound to the iron atoms following formation of the tetra-sulfo iron-phthalocyanine. This driving off, i.e., stripping, of the resulting oxygen molecules may discourage oxidation of the mercaptans to disulfides and/or oxidative degradation of the amine or other treatment composition, which may in turn result in increased mercaptan removal when the tetra-sulfo iron-phthalocyanine reaches the absorber or other contactor and is brought into contact with the hydrocarbon stream.

Other applications for which the final synthesis product and/or the amine-stabilized tetra-sulfo iron-phthalocyanine of the invention may be used include various electrochemical reactions, biochemical reactions, hydroformylation reactions, reforming, alkylation, transalkylation, Diels Alders reactions, cycloalkylation, dehydrogenation, decyclodehydrogenations, oxidation of various organic compounds to ketones and carboxylic acids, reduction of inorganic and organic compounds in aqueous or organic solutions, combinations thereof, and the like.

In general, when the final synthesis product and/or the amine-stabilized tetra-sulfo iron-phthalocyanine of the present invention is used for gas-treating, the treatment conditions will include a temperature of from about 0° C. to about 500° C., and a pressure of from about 1 to about 200 atmospheres, such pressure and temperature being preferably such that the treatment is carried out in liquid phase. The tetra-sulfo iron-phthalocyanine may be employed on a support, such as charcoal or another solid carrier, or may be dispersed within a liquid medium, such as, for example, an alkaline medium.

The invention having been generally described, the following examples are given as particular embodiments of the invention and to demonstrate the practice and advantages thereof. It is understood that the examples are given by way of illustration and are not intended to limit the specification or the claims to follow in any manner.

SPECIFIC EMBODIMENTS OF THE INVENTION

Example 1

About 282.52 g of 50 wt-percent 4-sulfophthalic acid, 229.74 g or urea, 50 g of ammonium iron(II) sulfate hexahydrate, 2.76 g of boric acid and 102 mg of ammonium molybdate tetrahydrate are charged to a 150×75 mm recrystallizing dish. The dish is placed in a muffle furnace preheated to 180° C. After 2.5 hours the furnace temperature is raised to 220° C. for five hours, then raised again to 240° C. for 1.5 hours. The crude material is then allowed to cool to room temperature and then ground to a fine powder with a mortar and pestle.

The resulting powder is then taken up in one liter of 1M HCl saturated with NaCl, briefly brought to reflux with stirring, and then allowed to cool to room temperature. The resulting slurry is then filtered and dried in a muffle furnace overnight at 100° C. The solid is then ground using a mortar and pestle. The powder is then taken up in one liter of 80 percent (volume/volume) methanol and brought to reflux with stirring. The slurry is then filtered while still boiling hot and washed with a small amount of boiling methanol. The methanol wash is then repeated. The resulting solid is finally dried in a muffle furnace at 110° C. overnight to give 80 percent yield.

The final product is tetra-sulfo iron-phthalocyanine containing less than about 500 ppm phthalimides and phthalates and has acceptable foaming and filtering characteristics. In addition, the reaction product has an acceptable 4.1 percent iron level and low molybdenum level of about 800 ppm, as determined by inductively coupled plasma analysis.

Preferably, the reaction is carried out with protection against oxygen.

Comparative Example 1

This comparative example demonstrates the oleum method of sulfonation.

Under a nitrogen pad, about 55 g of 20 weight percent of fuming sulfuric acid is added slowly to about 10 g of iron-phthalocyanine. After the fuming sulfuric acid is completely added, the reaction mixture is heated to 50° C. for 2 hours. The reaction mixture is then cooled to room temperature and filtered. The filtrate is then washed with 500 mL of pH 8 water. The resulting solid is then removed and dried in a vacuum oven. The dried solid is then ground to a fine powder with a mortar and pestle. The final product is a dark gray powder having a tetra-sulfo iron-phthalocyanine yield of 70 percent. The material contains 12 percent sulfophthalimide, 25 percent phthalimide, 3 percent phthalic acid, and 0.8 percent sulfophthalic acid. A 1 percent solution of the material in 1:1 methyldiethanolamine:water yields excessive foaming characteristics and is non-filterable using standardized tests.

Comparative Example 2

This comparative example demonstrates the use of a sulfonated starting material such as disclosed by Webber and Busch, supra, as well as others.

About 240 g of 50 percent 4-sulfophthalic acid, 186.24 g of urea, 15.71 g of ammonium chloride, 60.14 g of ammonium iron(II) sulfate hexahydrate and 2.38 g of ammonium molybdate tetrahydrate are charged to a 150×75 mm recrystallizing dish. The resulting water is boiled off using a hotplate, then the dish is placed in a muffle furnace heated to 180° C. After one hour at 180° C., the oven is then heated to 200° C. for three hours. The now-solidified crude material is removed from the furnace and washed according to the method described by Webber and Busch to give a 50 percent of theoretical yield. The final tetra-sulfo iron-phthalocyanine product contains less than about 500 ppm phthalimides and phthalates and acceptable foaming and filterability characteristics. However, the reaction yields low iron levels of 3 percent and very high molybdenum levels of 1.9 percent.

Example 2

Example 2 demonstrates the amine stabilization for iron (II) only tetra-sulfo iron-phthalocyanine.

Production of the crude tetra-sulfo iron-phthalocyanine remained the same as Example 1, including using an iron(II) salt as the iron source. Once the crude tetra-sulfo iron-phthalocyanine had been ground to a fine powder, the two purification steps, acid wash and alcohol wash, were performed under anaerobic conditions. While maintaining an inert atmosphere, three grams of purified tetra-sulfo iron-phthalocyanine was taken up in 97 g of degassed 1:1 Methyldiethanol amine (MDEA):H$_2$O. Once the solid was completely dissolved in the aqueous amine mixture, exposure to air did not oxidize the iron center to the iron(III) oxidation state. Comparative analysis of the purified tetra-sulfo iron-phthalocyanine showed that if the purified tetra-sulfo iron-phthalocyanine is exposed to air prior to being dissolved in amine, the visible spectra changes to reflect oxidation of the iron center to iron(III) while the visible spectrum of the amine stabilized tetra-sulfo iron-phthalocyanine solution remained unchanged.

What is claimed is:

1. A method of providing a hydrocarbon treatment composition, said method comprising the steps of:
   a) using a sulfonated reactant in the presence of a boron-containing promoter to make tetra-sulfo iron phthalocyanine; and
   b) causing the tetra-sulfo iron phthalocyanine to be combined at least with a treatment amine to form an aqueous liquid hydrocarbon treatment composition, and
   c) contacting the aqueous liquid hydrocarbon treatment composition with a hydrocarbon.

2. The method of claim 1, wherein the sulfonated reactant is selected from the group consisting of 4-sulfophthalic acid or a salt thereof, 4-sulfophthalimide or a salt thereof, 4-sulfophthalic anhydride, and combinations thereof.

3. The method of claim 1, wherein the using step comprises reacting the sulfonated reactant with an iron donor and a nitrogen donor in the presence of the boron-containing promoter to make the tetra-sulfo iron phthalocyanine.

4. The method of claim 3, wherein the iron donor comprises an iron(II) salt.

5. The method of claim 3, wherein the nitrogen donor is selected from the group consisting of urea, aluminum ammonium sulfate, ammonium borate, biuret, hydrazine, guanidine, and combinations thereof.

6. The method of claim 3, wherein the using step comprises reacting the sulfonated reactant with the iron donor and the nitrogen donor in the presence of the boron-containing promoter and a molybdenum-containing promoter to make the tetra-sulfo iron-phthalocyanine.

7. The method of claim 1, further comprising the steps of:
   a) washing the tetra-sulfo iron phthalocyanine in an acidic medium; and
   b) after the acid washing step, contacting the tetra-sulfo iron-phthalocyanine with a medium comprising at least one alcohol.

8. The method of claim 1, further comprising the step of washing the tetra-sulfo iron phthalocyanine in the presence of a salt.

9. The method of claim 1, further comprising the step of washing the tetra-sulfo iron phthalocyanine in an acidic medium.

10. The method of claim 1, further comprising the step of washing the tetra-sulfo iron phthalocyanine in an acidic medium in the presence of a salt.

11. The method of claim 10, further comprising, after said washing, contacting the tetra-sulfo iron phthalocyanine with a medium comprising at least one alcohol.

12. The method of claim 1, wherein the tetra-sulfo iron phthalocyanine comprises at least about 5.5 percent, by weight, of chelated iron.

13. The method of claim 1, further comprising the step of, prior to step (b), combining the tetra-sulfo iron phthalocyanine with a stabilizing amount of a stabilizing amine.

14. The method of claim 1, further comprising the step of, prior to step (b), preparing an aqueous solution comprising the tetra-sulfo iron phthalocyanine and a stabilizing amount of a stabilizing amine.

15. The method of claim 1, further comprising the step of causing the tetra-sulfo iron phthalocyanine to contact steam, prior to step (b), during step (b), and/or after step (b).

16. A method of treating a hydrocarbon comprising the steps of:
   a) providing an aqueous solution comprising tetra-sulfo iron phthalocyanine and a stabilizing amount of a complexing agent;
   b) combining the aqueous solution at least with an amount of a treatment amine to form an aqueous liquid hydrocarbon treatment composition; and
   c) contacting a hydrocarbon with the aqueous liquid hydrocarbon treatment composition.

17. The method of claim 16, wherein the complexing agent comprises a stabilizing amine.

18. The method of claim 16, further comprising the step of contacting the tetra-sulfo iron phthalocyanine with steam.

* * * * *